(12) United States Patent
Ueda et al.

(10) Patent No.: US 11,267,123 B2
(45) Date of Patent: Mar. 8, 2022

(54) ROBOT SYSTEM AND COUPLING METHOD

(71) Applicant: Seiko Epson Corporation, Tokyo (JP)

(72) Inventors: Junya Ueda, Azumino (JP); Hideki Hata, Chino (JP); Masaki Miyasaka, Chino (JP)

(73) Assignee: Seiko Epson Corporation

( * ) Notice: Subject to any disclaimer, the term of this patent is extended or adjusted under 35 U.S.C. 154(b) by 291 days.

(21) Appl. No.: 16/684,728

(22) Filed: Nov. 15, 2019

(65) Prior Publication Data

US 2020/0156249 A1 May 21, 2020

(30) Foreign Application Priority Data

Nov. 16, 2018 (JP) .............................. JP2018-215966

(51) Int. Cl.
*B25J 9/16* (2006.01)
*B25J 15/00* (2006.01)
*B25J 9/10* (2006.01)

(52) U.S. Cl.
CPC ........... *B25J 9/1687* (2013.01); *B25J 9/1015* (2013.01); *B25J 9/1633* (2013.01); *B25J 9/1674* (2013.01); *B25J 9/1697* (2013.01); *B25J 15/0004* (2013.01)

(58) Field of Classification Search
CPC ...... B25J 9/0023; B25J 9/1015; B25J 9/1612; B25J 9/1633; B25J 9/1674; B25J 9/1687; B25J 13/085; B25J 15/0004; B25J 15/0028; B25J 15/0052; B25J 19/023; G05B 2219/39001; G05B 2219/39506; G05B 2219/40028; G05B 19/40372; G05B 2219/40584; G05B 2219/45033; G05B 2219/45097; H01R 12/62; H01R 43/01; H01R 43/205

See application file for complete search history.

(56) References Cited

U.S. PATENT DOCUMENTS

2017/0151666 A1* 6/2017 Kobayashi ............. B25J 9/1633
2017/0312921 A1* 11/2017 Kobayashi ............. B25J 9/1687
2020/0067255 A1    2/2020 Takeyama et al.
2020/0376679 A1* 12/2020 Takeyama ............ B25J 15/0253

FOREIGN PATENT DOCUMENTS

JP    2017-224527 A    12/2017
KR    20140094155 A     7/2014
WO    2018/207552 A1   11/2018

* cited by examiner

*Primary Examiner* — Dale Moyer
(74) *Attorney, Agent, or Firm* — Harness, Dickey & Pierce, P.L.C.

(57) ABSTRACT

A robot system that performs work of coupling a cable to a connector provided on a board, includes a robot in which a gripping unit that grips the cable and a force detection unit that detects a force acting on the gripping unit are provided, and a robot control apparatus that controls the robot, wherein the robot control apparatus controls the robot to perform a conveyance action for the gripping unit to grip the cable with a first gripping force and convey the cable onto the board, a correction action for the gripping unit to grip the cable with a second gripping force and correct a posture of the cable based on the force acting by pressing the cable against the connector, and an insertion action for the gripping unit to grip the cable with a third gripping force and insert the cable into the connector.

12 Claims, 12 Drawing Sheets

ROBOT SYSTEM AND COUPLING METHOD

The present application is based on, and claims priority from, JP Application Serial Number 2018-215966, filed Nov. 16, 2018, the disclosure of which is hereby incorporated by reference herein in its entirety.

BACKGROUND

1. Technical Field

The present disclosure relates to a robot system and coupling method.

2. Related Art

For example, JP-A-2017-224527 discloses a single-arm robot including a base and a single arm. The robot disclosed in JP-A-2017-224527 has a gripping mechanism for gripping an FFC (Flexible Flat Cable) attached to the distal end portion of the arm, and may perform coupling work of inserting and coupling the FFC into a connector in the attachment state.

However, in the robot disclosed in JP-A-2017-224527, there is a problem that, for example, when the gripping position of the FFC by the gripping mechanism is inaccurate, it is difficult to accurately insert the FFC into the connector and, as a result, the coupling work is failed.

SUMMARY

The present disclosure can be implemented as the following embodiments.

A robot system according to an aspect of the present disclosure is a robot system that performs work of coupling a flexible cable to a connector provided on a board, including a robot in which a gripping unit that grips the cable and a force detection unit that detects a force acting on the gripping unit are provided, and a robot control apparatus that controls the robot, wherein the robot control apparatus controls the robot to perform a conveyance action for the gripping unit to grip the cable with a first gripping force and convey the cable onto the board, a correction action for the gripping unit to grip the cable with a second gripping force smaller than the first gripping force and correct a posture of the cable based on the force acting by pressing the cable against the connector, and an insertion action for the gripping unit to grip the cable with a third gripping force larger than the second gripping force and insert the cable into the connector.

A coupling method according to an aspect of the present disclosure is a coupling method of coupling a flexible cable to a connector provided on a board, including a preparation step of preparing a robot in which a gripping unit that grips the cable and a force detection unit that detects a force acting on the gripping unit are provided, a conveyance step of gripping the cable with a first gripping force and conveying the cable onto the board by the gripping unit, a correction step of gripping the cable with a second gripping force smaller than the first gripping force and correcting a posture of the cable based on the force acting by pressing the cable against the connector by the gripping unit, and an insertion step of gripping the cable with a third gripping force larger than the second gripping force and inserting the cable into the connector by the gripping unit.

DESCRIPTION OF EXEMPLARY EMBODIMENTS

As below, a robot system and coupling method according to the present disclosure will be explained in detail based on preferred embodiments shown in the accompanying drawings. Hereinafter, for convenience of explanation, the upsides in FIGS. 1 and 3 to 12 may be referred to as "upper" or "above" and the downsides may be referred to as "lower"

or "below". Further, "horizontal" in this specification is not limited to a completely horizontal state, but includes states with slight inclinations (e.g. less than about 10°) relative to the horizontal state. Furthermore, "vertical" in this specification is not limited to a completely vertical state, but includes states with slight inclinations (e.g. less than about 10°) relative to the vertical state unless conveyance of electronic components is hindered.

Figure 1:
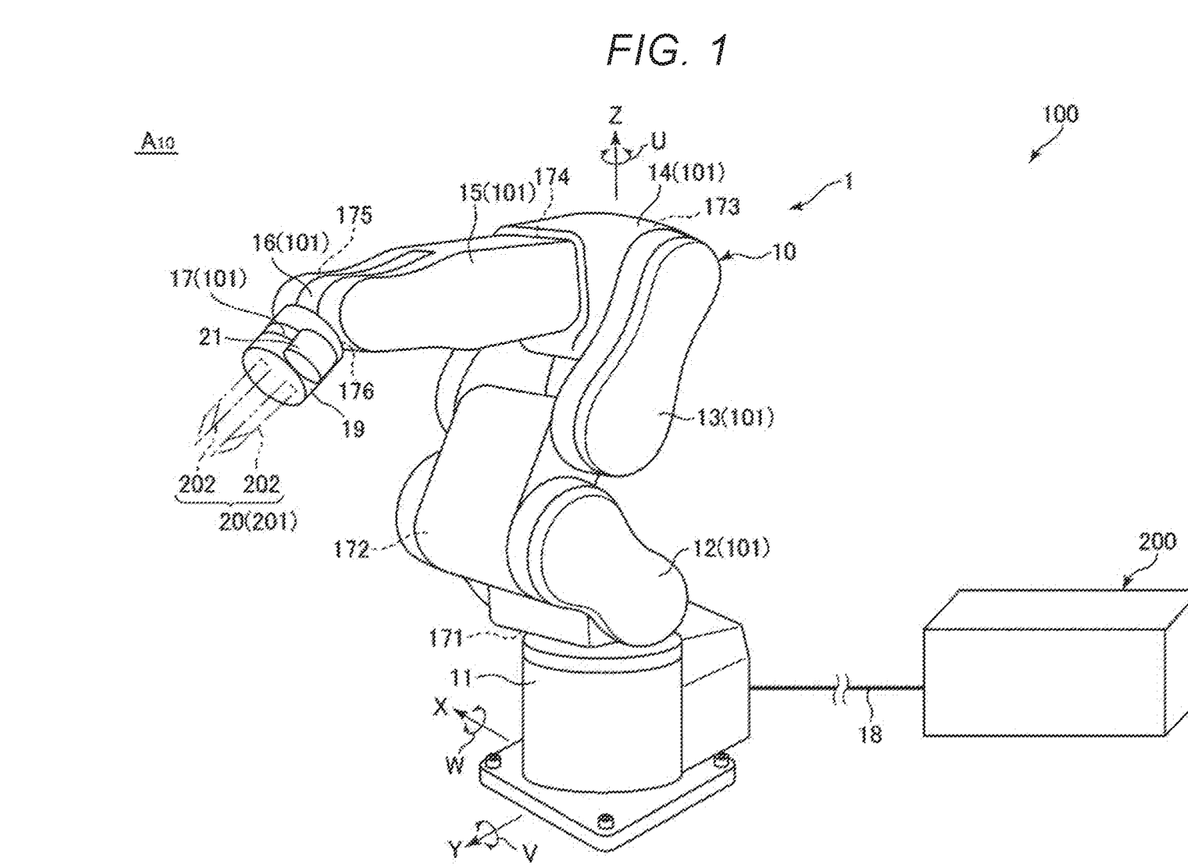
FIG. 1 shows an overall configuration of a robot system.

As shown in FIG. 1, a robot system 100 includes a robot 1 and a robot control apparatus (hereinafter, simply referred to as "control apparatus") 200 that controls the robot 1.

The robot 1 is a single-arm six-axis vertical articulated robot in the embodiment, and an end effector 20 may be attached to the distal end portion thereof. The robot 1 is the single-arm articulated robot, however, may be e.g. a dual-arm articulated robot.

The control apparatus 200 is placed apart from the robot 1 and includes a computer with a CPU (Central Processing Unit) as an example of a processor provided inside etc. The robot system 100 may perform coupling work of coupling a flexible cable 93 to a connector 92 provided on a board 91.

The robot 1 has a base 11 and a movable unit 10.

The base 11 is a support that supports the movable unit 10 drivably from below, and fixed to e.g. a floor within a factory. In the robot 1, the base 11 is electrically coupled to the control apparatus 200 via a relay cable 18. Note that the coupling between the robot 1 and the control apparatus 200 is not limited to wired coupling like the configuration shown in FIG. 1, but may be wireless coupling or coupling via a network such as the Internet, for example.

The movable unit 10 has a plurality of arms 101 pivotably coupled to each other. The coupling work is performed on a workbench 300 placed within a drive range Aio in which the movable unit 10 can be driven at the maximum.

In the embodiment, the movable unit 10 has a first arm 12, a second arm 13, a third arm 14, a fourth arm 15, a fifth arm 16, and a sixth arm 17, and these arms 101 are sequentially coupled from the base 11 side. Note that the number of arms 101 of the movable unit 10 is not limited to six, but may be e.g. one, two, three, four, five, seven, or more. Further, the sizes of the respective arms 101 including the entire lengths are respectively not particularly limited, but can be appropriately set.

The base 11 and the first arm 12 are coupled via a joint 171. The first arm 12 is pivotable around a first pivot axis parallel to the vertical direction as a pivot center about the first pivot axis relative to the base 11. The first pivot axis coincides with the normal of the floor to which the base 11 is fixed.

The first arm 12 and the second arm 13 are coupled via a joint 172. The second arm 13 is pivotable around a second pivot axis parallel to the horizontal direction as a pivot center relative to the first arm 12. The second pivot axis is parallel to an axis orthogonal to the first pivot axis.

The second arm 13 and the third arm 14 are coupled via a joint 173. The third arm 14 is pivotable around a third pivot axis parallel to the horizontal direction as a pivot center relative to the second arm 13. The third pivot axis is parallel to the second pivot axis.

The third arm 14 and the fourth arm 15 are coupled via a joint 174. The fourth arm 15 is pivotable around a fourth pivot axis parallel to the center axis direction of the third arm 14 as a pivot center relative to the third arm 14. The fourth pivot axis is orthogonal to the third pivot axis.

The fourth arm 15 and the fifth arm 16 are coupled via a joint 175. The fifth arm 16 is pivotable around a fifth pivot axis as a pivot center relative to the fourth arm 15. The fifth pivot axis is orthogonal to the fourth pivot axis.

The fifth arm 16 and the sixth arm 17 are coupled via a joint 176. The sixth arm 17 is pivotable around a sixth pivot axis as a pivot center relative to the fifth arm 16. The sixth pivot axis is orthogonal to the fifth pivot axis.

Further, the sixth arm 17 is a robot distal end portion located at the most distal end side of the movable unit 10. The sixth arm 17 may pivot together with the end effector 20 by driving of the movable unit 10.

In the robot 1, a force detection unit 19 that detects a force is detachably placed in the movable unit 10. The movable unit 10 may be driven with the force detection unit 19 placed therein.

In the embodiment, the force detection unit 19 is placed in the sixth arm 17. Note that the location in which the force detection unit 19 is placed is not limited to the sixth arm 17, i.e., the arm 101 located at the most distal end side, but may be e.g. the other arm 101 or between the adjacent arms 101.

Figure 3:
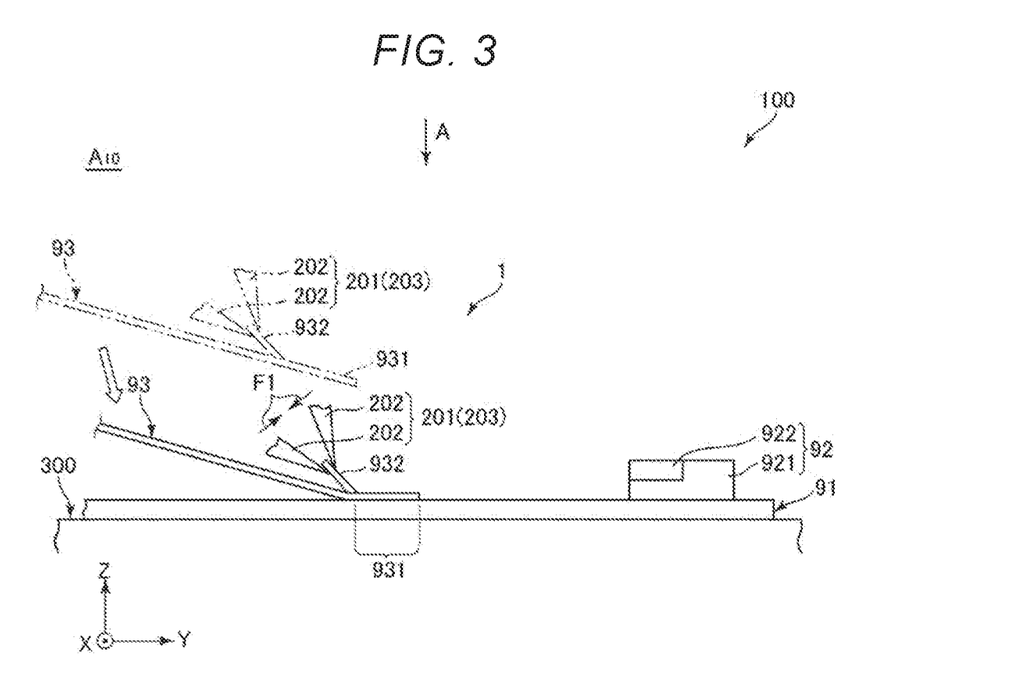
FIG. 3 is a side view sequentially showing an action state of a robot when the robot system shown in FIG. 1 executes the coupling method shown in FIG. 2.

The end effector 20 may be detachably attached to the force detection unit 19. The end effector 20 is a gripping unit 201 configured to grip the cable 93. As shown in FIG. 3, the gripping unit 201 includes a nipping part 203 having a pair of nipping pieces 202 that nip the cable 93, and may grip the cable 93 by the nipping.

Further, the gripping unit 201 is configured to change the gripping force, i.e., the nipping force for the cable 93. The configuration is not particularly limited. For example, the gripping force can be changed by changing the degree of closeness between the nipping pieces 202.

The gripping unit 201 is not limited to one that grips the cable 93 by nipping, but may be e.g. one that grips the cable 93 by suction.

The force detection unit 19 may detect a force acting on the gripping unit 201 at the coupling work by the robot 1 or the like. The force detection unit 19 is not particularly limited, but, in the embodiment, a six-axis force sensor that can detect force components in respective axis directions of an X-axis, a Y-axis, a Z-axis orthogonal to one another, a force component in W directions about the X-axis, a force component in V directions about the Y-axis, and a force component in U directions about the Z-axis is used. Note that, in the embodiment, the Z-axis direction is the vertical direction. Further, the force components in the respective axis directions may be referred to as "translational force components" and the force components about the respective axes may be referred to as "torque components". The force detection unit 19 is not limited to the six-axis force sensor, but may have another configuration.

As shown in FIG. 1, the robot 1 has an imaging unit 21 coupled to the fifth arm 16. The imaging unit 21 may capture e.g. the cable 93 gripped by the gripping unit 201 and the connector 92 on the board 91 together. Note that the imaging unit 21 is not particularly limited, but e.g. a CCD (Charge Coupled Device) camera or the like may be used.

Figure 12:
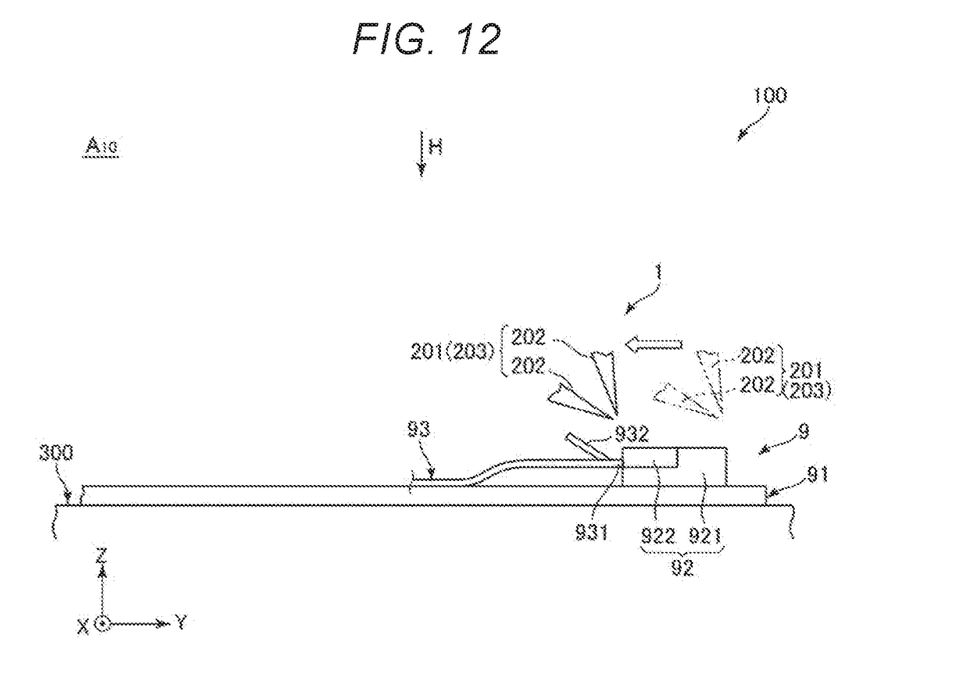
FIG. 12 is a side view sequentially showing an action state of the robot when the robot system shown in FIG. 1 executes the coupling method shown in FIG. 2.
Figure 20:
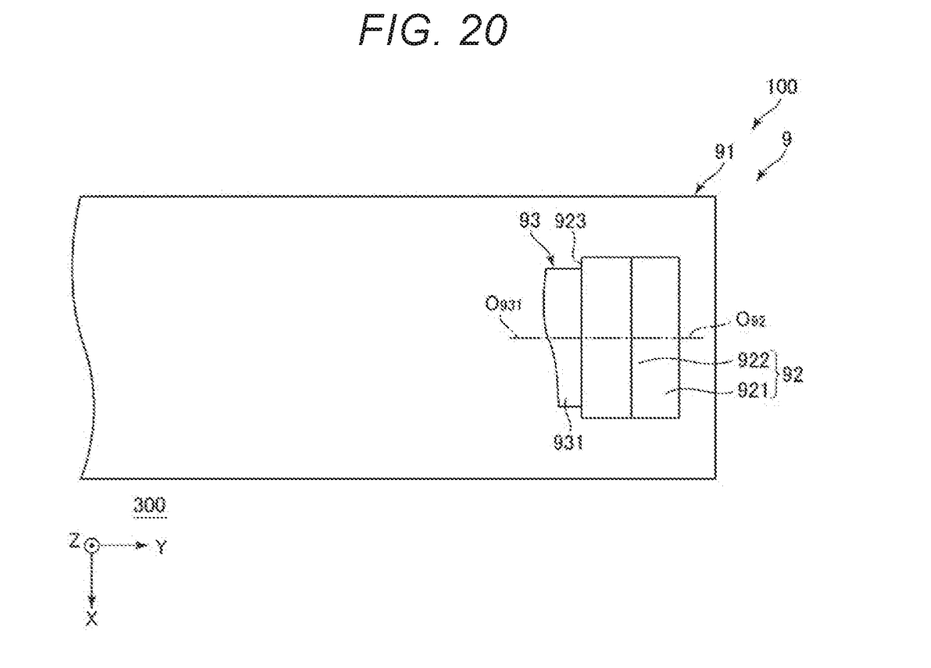
FIG. 20 is a view as seen from a direction of an arrow H in FIG. 12.

As described above, the robot system 100 is used in the coupling work of coupling the flexible cable 93 to the connector 92 provided on the board 91. By the coupling work, an electronic component assembly 9 shown in FIGS. 12 and 20 is obtained.

As shown in FIGS. 3 to 20, the board 91 is a circuit board having a plate shape on which a circuit pattern (not shown) is formed.

Onto the board 91, the connector 92 is fixed. The connector 92 has a plurality of terminals (not shown) electrically coupled to the circuit pattern.

Further, in the embodiment, the connector 92 is the so-called "two-action connector". The connector 92 has a connector main body 921 and a lid body 922 pivotably supported on the connector main body 921. The lid body 922 may open and close by pivoting about an axis parallel to the X-axis. The lid body 922 is in an open state prior to insertion of the cable 93 and an closed state after the insertion of the cable 93. Note that the connector 92 is not limited to "two-action connector", but may be e.g. the so-called "one-action connector" without the lid body 922.

The cable 93 is an FPC (Flexible Printed Circuits) or FFC (Flexible Flat Cable) in an elongated shape having flexibility. A coupling end portion 931 having a plurality of terminals (not shown) to be inserted into the connector 92 and electrically coupled to the respective terminals of the connector 92 is provided in an end part of the cable 93. Further, a tab 932 as a small piece is formed to project in the middle of the cable 93 in the longitudinal direction. For gripping the cable 93, the gripping unit 201 may perform the gripping action by nipping the tab 932.

Figure 2:
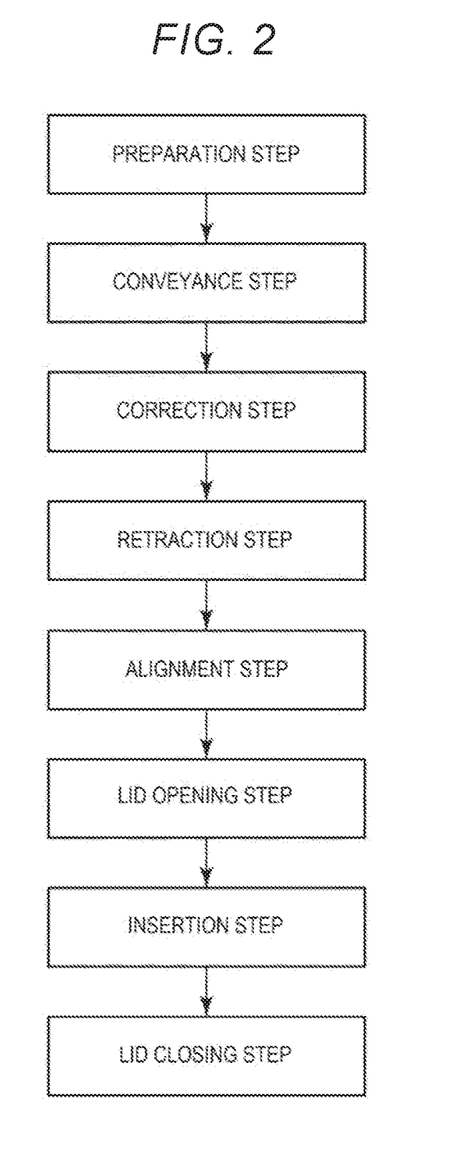
FIG. 2 is a flowchart sequentially showing steps of a coupling method.

The robot system 100 having the above described configuration may execute a coupling method of coupling the cable 93 to the connector 92 on the board 91. As shown in FIG. 2, the coupling method has a preparation step, a conveyance step, a correction step, a retraction step, an alignment step, a lid opening step, an insertion step, and a lid closing step. Further, when the robot system 100 executes the coupling method, the control apparatus 200 controls the robot 1 to perform a conveyance action at the conveyance step, a correction action at the correction step, a retraction action at the retraction step, an alignment action at the alignment step, a lid opening action at the lid opening step, an insertion action at the insertion step, and a lid closing action at the lid closing step.

1 Preparation Step

The preparation step is a step of preparing the robot 1 in which the gripping unit 201 and the force detection unit 19 are provided and the control apparatus 200. Here, "preparation" refers to starting up of the robot system 100 into an operable state in the coupling work by the robot system 100.

At the preparation step, the preparation is made with the board 91 held on the workbench 300 in a horizontal posture. The state is maintained until the lid closing step. Further, the connector 92 is previously fixed to the board 91. In the connector 92, the lid body 922 is closed.

Further, at the preparation step, the cable 93 is also previously prepared on a workbench (not shown) different from the workbench 300. The gripping unit 201 may grip and convey the tab 932 of the cable 93 from the workbench at the conveyance step as the next step.

2 Conveyance Step

As shown in FIG. 3, the gripping unit 201 grips the tab 932 of the cable 93 with a first gripping force F1. Hereinafter, the state is referred to as "first gripping state". The conveyance step is a step at which the conveyance action to convey the cable 93 onto the board 91 is performed in the first gripping state. The first gripping force F1 may also be referred to as "first nipping force" for nipping the tab 932, and preferably has magnitude that may prevent the cable 93 from dropping off the gripping unit 201 during conveyance of the cable 93. For example, the gripping unit 201 may be configured to change the gripping force thereof using a motor.

During the conveyance action, a force acts on the gripping unit 201 after the coupling end portion 931 of the cable 93 comes into contact with the board 91. The force is detected by the force detection unit 19. Then, the control apparatus 200 controls a time to stop the conveyance action based on a detection result in the force detection unit 19. For example, when the force detected by the force detection unit 19 reaches a first threshold value, the apparatus stops the conveyance action.

Further, at the conveyance step, the conveyance action is performed with the tab 932 of the cable 93 nipped so that the nipping directions by the gripping unit 201, i.e., the nipping part 203 may be along the upward and downward directions. Thereby, the posture of the coupling end portion 931 relative to the board 91 becomes stable and the force detection by the force detection unit 19 may be stably performed.

Figure 13:
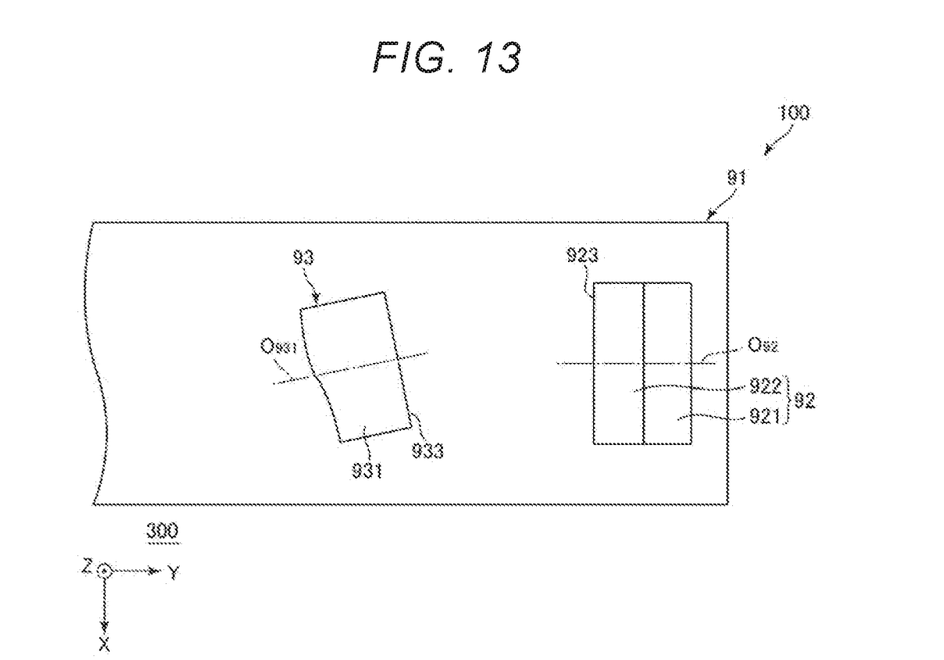
FIG. 13 is a view as seen from a direction of an arrow A in FIG. 3.

On the board 91, the cable 93 stops in a position where the coupling end portion 931 is apart from the connector 92 at the negative side in the Y-axis direction. In this regard, as an example, it is assumed that a center line $O_{931}$ of the coupling end portion 931 is inclined relative to a center line $O_{92}$ of the connector 92 as shown in FIG. 13. Here, the center line $O_{92}$ is parallel to the Y-axis. Further, an end surface 933 of the coupling end portion 931 of the cable 93 faces the side of the connector main body 921 of the connector 92.

3 Correction Step

Figure 4:
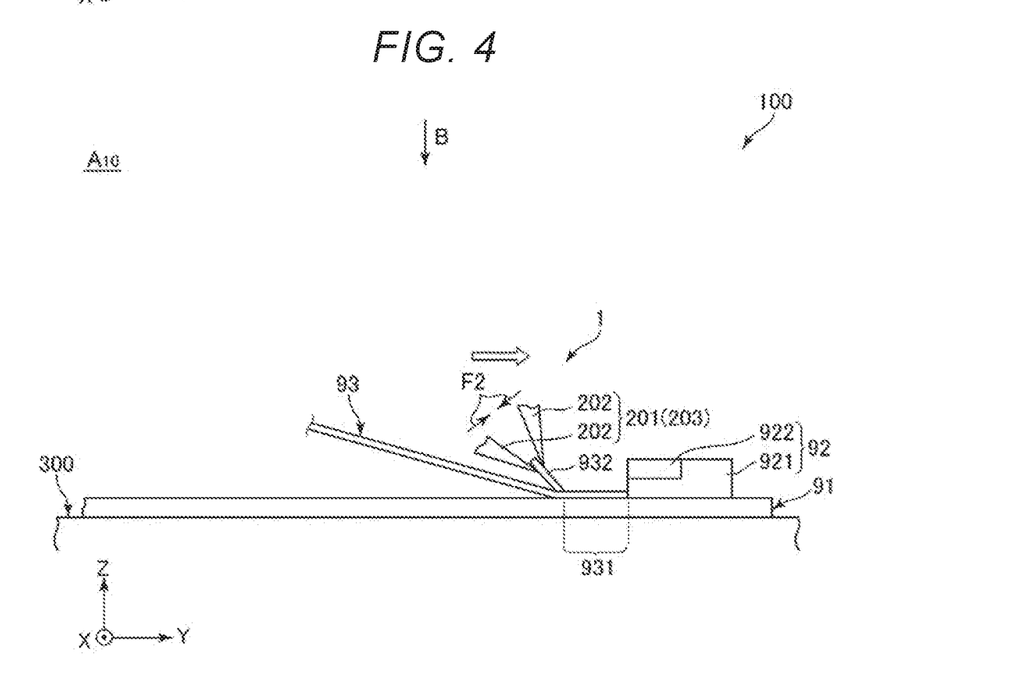
FIG. 4 is a side view sequentially showing an action state of the robot when the robot system shown in FIG. 1 executes the coupling method shown in FIG. 2.

As shown in FIG. 4, the gripping unit 201 grips the cable 93 with a second gripping force F2 smaller than the first gripping force F1. Hereinafter, the state is referred to as "second gripping state". The second gripping force F2 may also be referred to as "second nipping force" for nipping the tab 932, and preferably has magnitude such that, when an external force is applied to the coupling end portion 931 of the cable 93, the tab 932 may slidingly move, that is, slide between the pair of nipping pieces 202.

Figure 14:
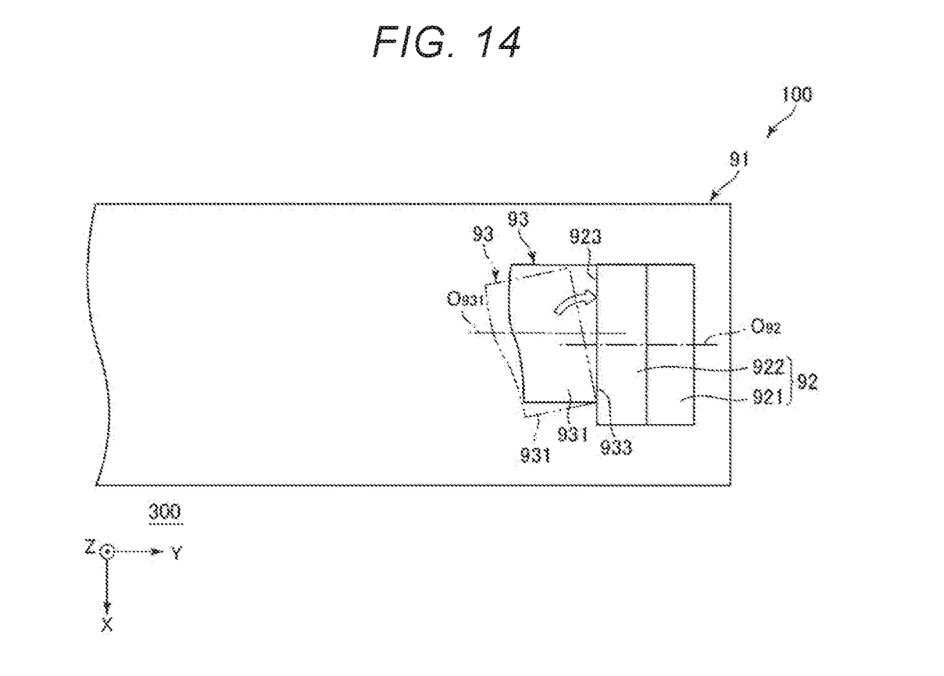
FIG. 14 is a view as seen from a direction of an arrow B in FIG. 4.

At the correction step, first, the coupling end portion 931 of the cable 93 is moved along the planer direction of the board 91 toward the connector 92 to the positive side in the Y-axis direction in the second gripping state. Then, the coupling end portion 931 is further moved, and thereby, as shown in FIG. 14, the end surface 933 of the coupling end portion 931 is pressed against an end surface 923 of the connector main body 921 at the negative side in the Y-axis direction. Because of the pressing in cooperation with being in the second gripping state, the end surface 933 of the coupling end portion 931 is moved to fit with the end surface 923 of the connector main body 921, and the center line $O_{931}$ of the coupling end portion 931 becomes parallel to the center line $O_{92}$ of the connector 92. Thereby, the correction action to correct the cable 93 to be insertable into the connector 92 is performed.

During the correction action, the coupling end portion 931 of the cable 93 comes into contact with the connector main body 921 of the connector 92 and a force acts on the gripping unit 201. The force is detected by the force detection unit 19. Then, the control apparatus 200 controls a time to stop the correction action based on a detection result in the force detection unit 19. For example, when the force detected by the force detection unit 19 reaches a second threshold value, the apparatus stops the correction action.

Further, at the correction step, the correction action is performed with the tab 932 of the cable 93 nipped so that the nipping directions by the nipping part 203 may be along the upward and downward directions. Thereby, when the end surface 933 of the coupling end portion 931 is pressed against the end surface 923 of the connector main body 921, the end surface 933 of the coupling end portion 931 may stably fit with the end surface 923 of the connector main body 921.

4 Retraction Step

Figure 5:
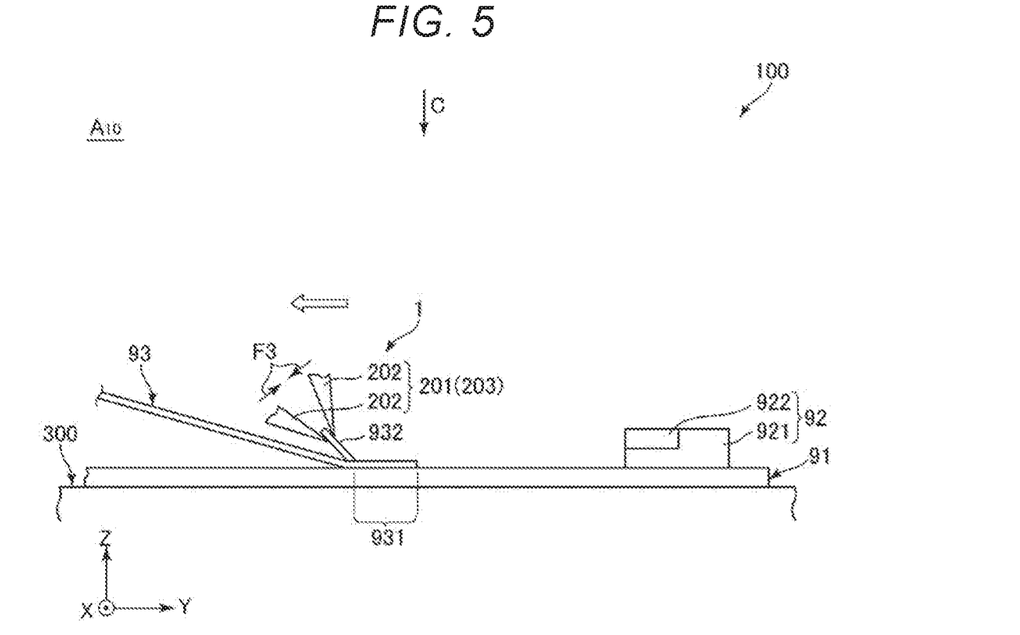
FIG. 5 is a side view sequentially showing an action state of the robot when the robot system shown in FIG. 1 executes the coupling method shown in FIG. 2.
Figure 15:
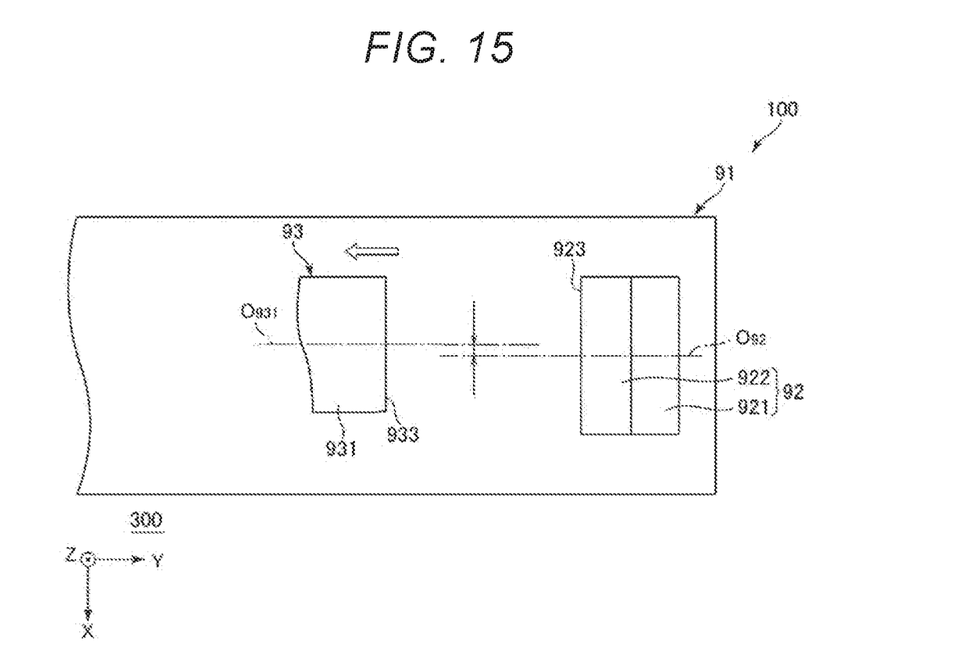
FIG. 15 is a view as seen from a direction of an arrow C in FIG. 5.

As shown in FIG. 5, the gripping unit 201 grips the cable 93 with a third gripping force F3 larger than the second gripping force F2. Thereby, as shown in FIG. 15, the state in which the center line $O_{931}$ of the coupling end portion 931 and the center line $O_{92}$ of the connector 92 are parallel is maintained. Hereinafter, the state is referred to as "third gripping state". The third gripping force F3 may also be referred to as "third nipping force" for nipping the tab 932, and may have the same magnitude as or different magnitude from the first gripping force F1. For example, in the case where the third gripping force F3 is larger than the first gripping force F1, when the cable 93 is inserted into the connector 92, the cable is gripped by the gripping unit 201 more strongly, and thereby, change in position relationship between the cable 93 and the gripping unit 201 by the force from the connector 92 may be suppressed.

The retraction step is a step of once retracting the coupling end portion 931 of the cable 93 in the third gripping state from the connector 92. Note that the retraction position of the coupling end portion 931 is not particularly limited, but may be e.g. the same position as the position of the coupling end portion 931 in FIG. 3 in the Y-axis directions. Thereby, at the alignment step as the next step, a gray-scaled image showing the position relationship between the cable 93 and the connector 92 may be captured.

5 Alignment Step

At the alignment step, first, the coupling end portion 931 of the cable 93 gripped by the gripping unit 201 and the connector 92 are captured together by the imaging unit 21, and thereby, a gray-scaled image showing the position relationship is obtained. Then, in the control apparatus 200, binarization processing is performed on the gray-scaled image and an amount of misalignment between the center line $O_{931}$ of the coupling end portion 931 and the center line $O_{92}$ of the connector 92 in the X-axis directions may be detected.

Figure 6:
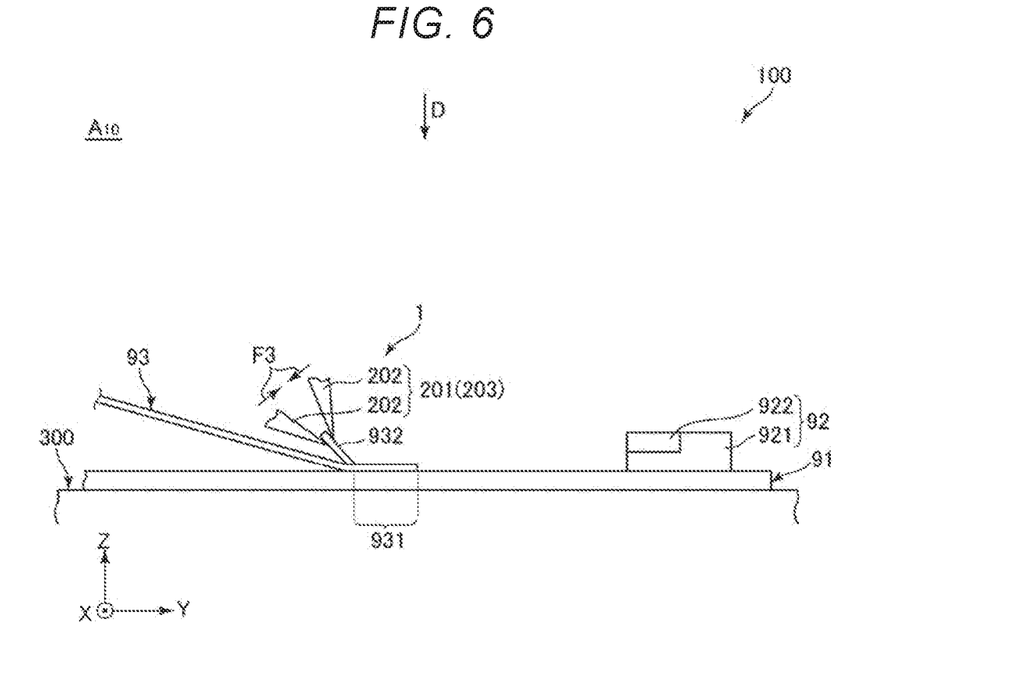
FIG. 6 is a side view sequentially showing an action state of the robot when the robot system shown in FIG. 1 executes the coupling method shown in FIG. 2.
Figure 16:
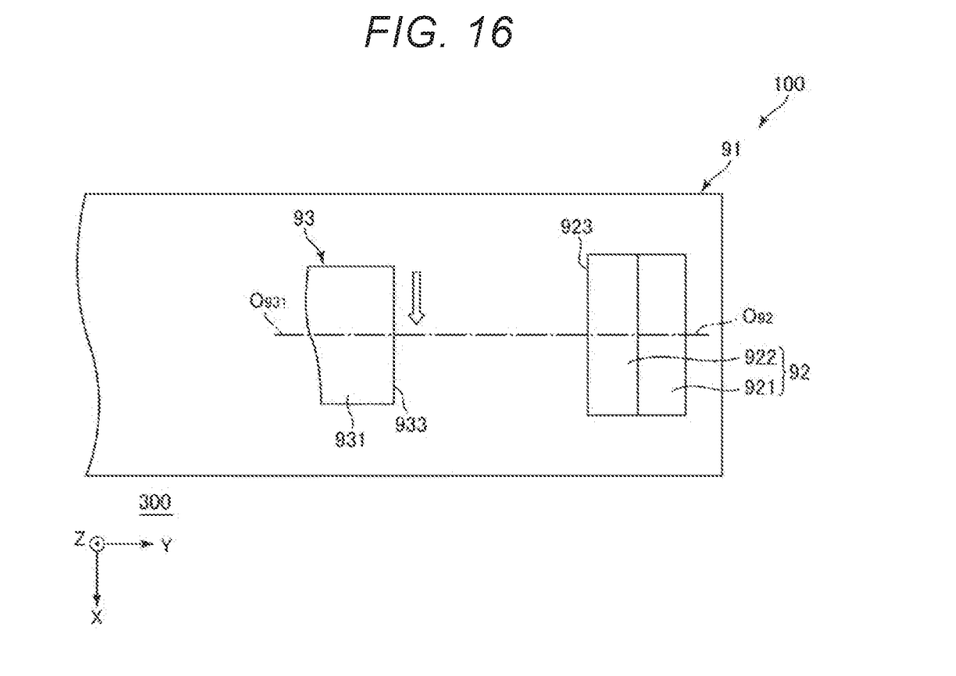
FIG. 16 is a view as seen from a direction of an arrow D in FIG. 6.

Then, remaining in the third gripping state shown in FIG. 6, the gripping unit 201 is moved toward the positive side in the X-axis direction by the amount of misalignment together with the coupling end portion 931. Thereby, as shown in FIG. 16, in plan view in a thickness direction of the board 91, the center line $O_{931}$ of the coupling end portion 931 and the center line $O_{92}$ of the connector 92 are located in the same straight line, and alignment between the cable and the connector 92 is completed. Hereinafter, the state is referred to as "aligned state". The aligned state is maintained until the coupling action by the robot system 100 is completed. Or, for example, alignment may be performed by matching the relationship between the position of the coupling end portion 931 and the position of the connector 92 from the gray-scaled image obtained by the imaging unit 21.

As described above, the robot 1 has the imaging unit 21 that captures the cable 93 gripped by the gripping unit 201 and the connector 92.

Then, at the alignment step between the correction action and the insertion action, the control apparatus 200 may control the robot 1 to perform the alignment action to align between the cable 93 gripped by the gripping unit 201 and the connector 92 based on the imaging result in the imaging unit 21 with the cable 93 once separated from the connector 92. Thereby, the insertion step of inserting the cable 93 into the connector 92 may be smoothly performed.

6 Lid Opening Step

Figure 7:
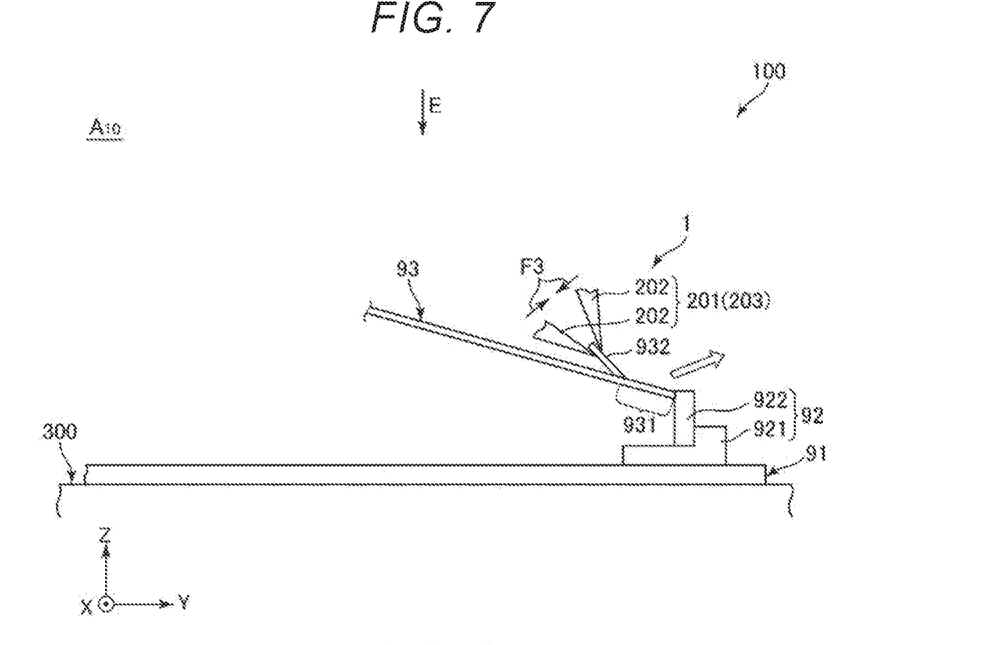
FIG. 7 is a side view sequentially showing an action state of the robot when the robot system shown in FIG. 1 executes the coupling method shown in FIG. 2.

As shown in FIG. 7, the lid opening step is a step for a lid opening action to open the closed lid body 922. At the lid opening step, the coupling end portion 931 of the cable 93 is engaged with the closed lid body 922 in the third gripping state, and the engaged coupling end portion 931 is moved toward the upper right in FIG. 7. Thereby, the lid body 922 may be opened. A program for the lid opening action is stored in the control apparatus 200 in advance.

Figure 17:
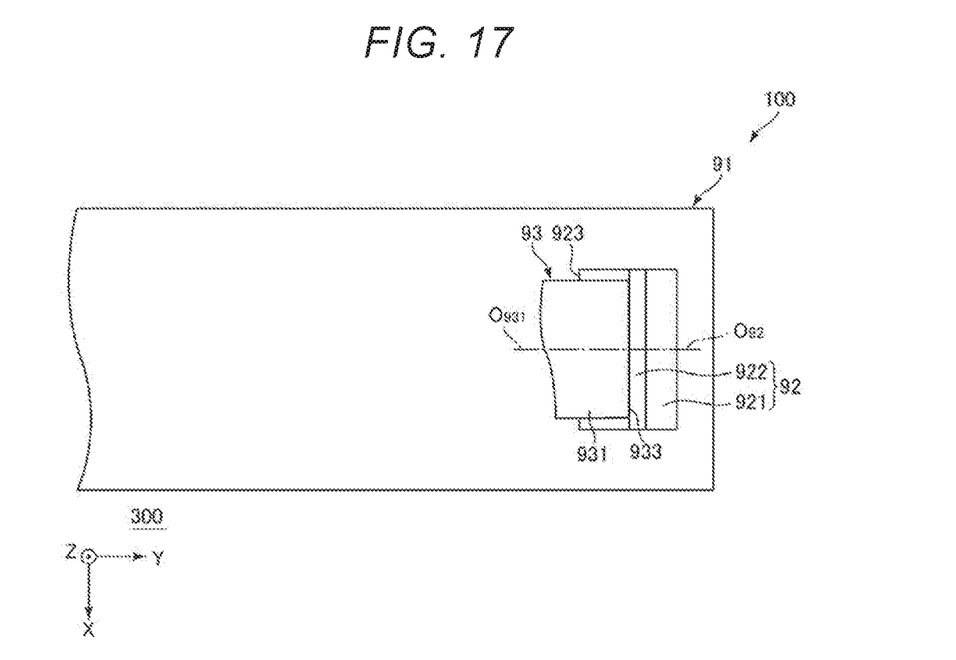
FIG. 17 is a view as seen from a direction of an arrow E in FIG. 7.

After the lid opening action, as shown in FIG. 17, the aligned state is still maintained.

7 Insertion Step

Figure 8:
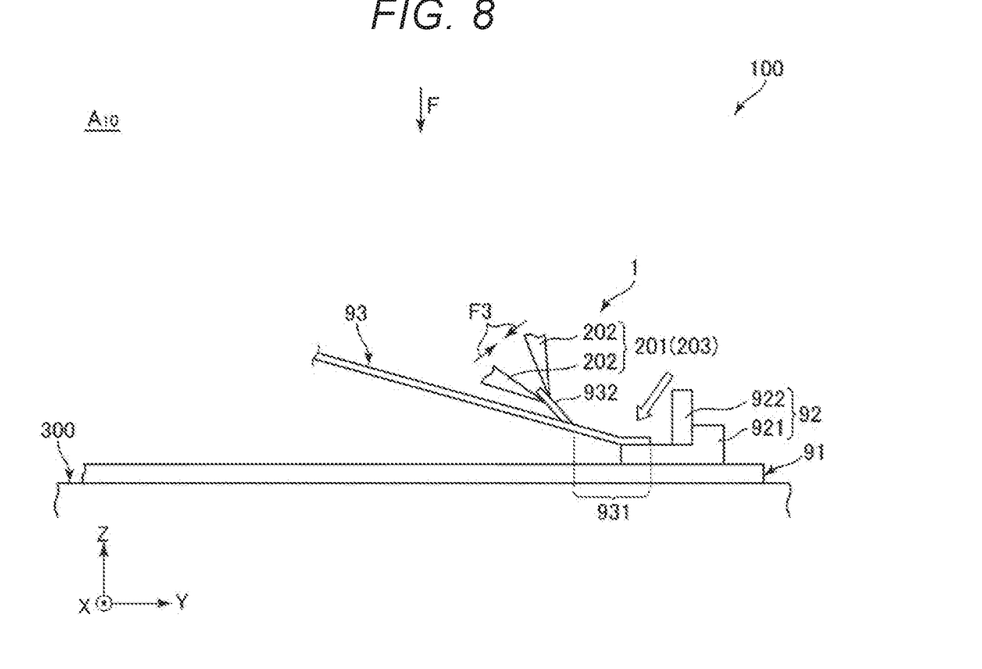
FIG. 8 is a side view sequentially showing an action state of the robot when the robot system shown in FIG. 1 executes the coupling method shown in FIG. 2.
Figure 9:
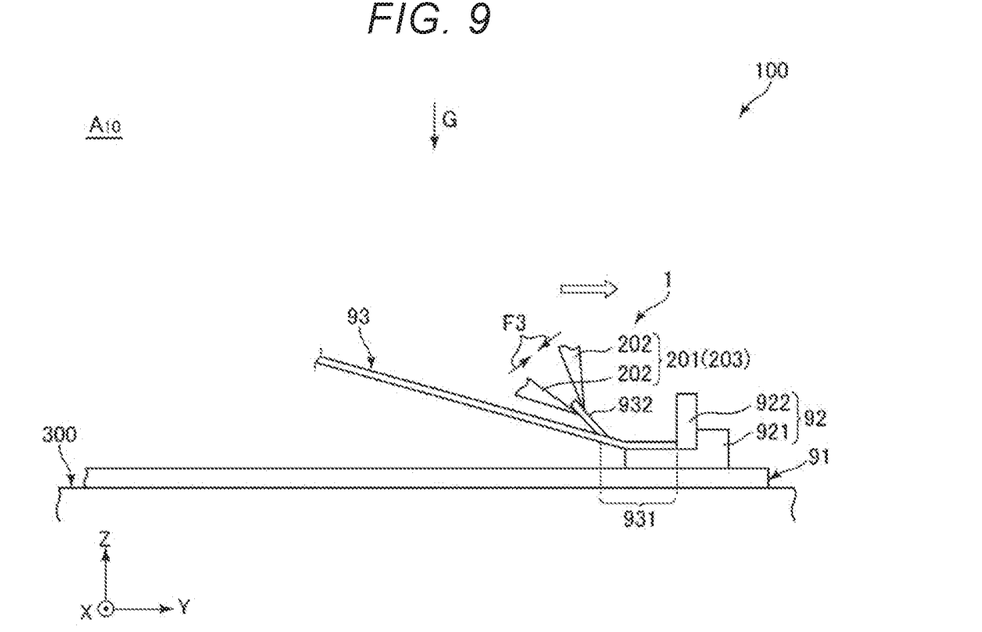
FIG. 9 is a side view sequentially showing an action state of the robot when the robot system shown in FIG. 1 executes the coupling method shown in FIG. 2.

As shown in FIGS. 8 and 9, the insertion step is a step for an insertion action to insert the cable 93 into the connector 92 in the third gripping state.

Figure 18:
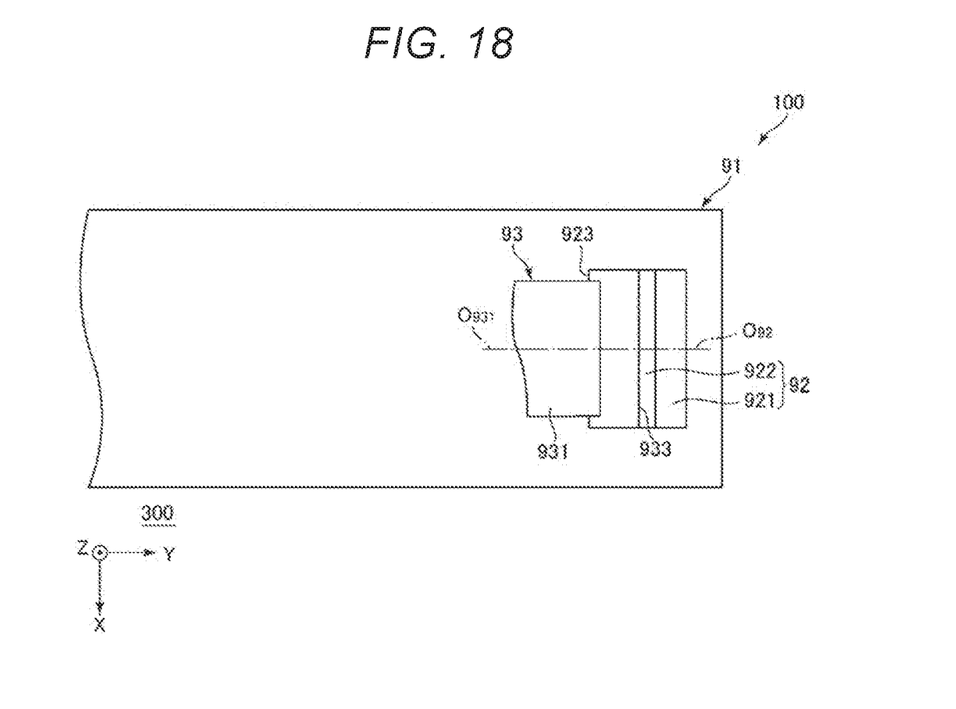
FIG. 18 is a view as seen from a direction of an arrow F in FIG. 8.
Figure 19:
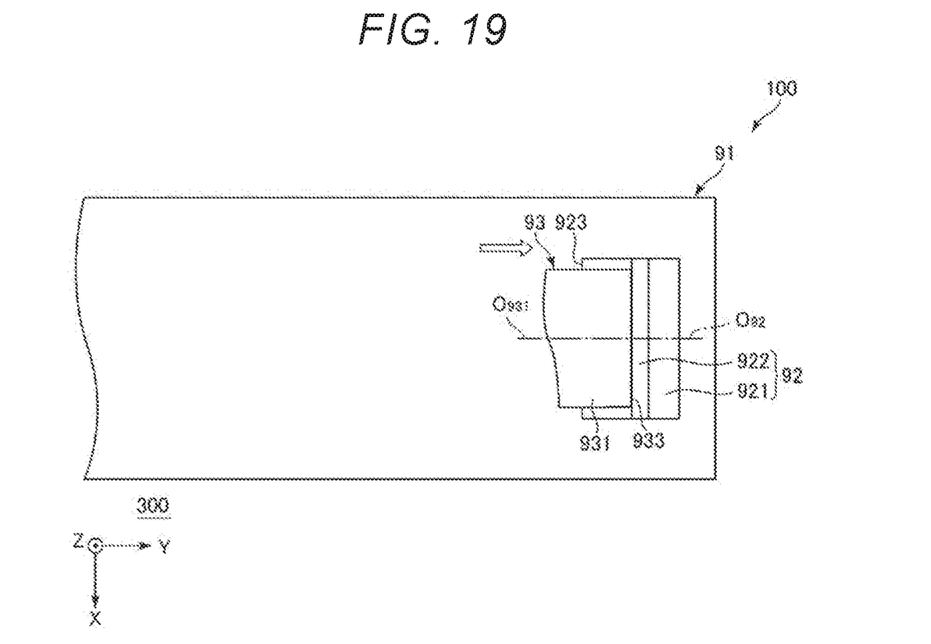
FIG. 19 is a view as seen from a direction of an arrow G in FIG. 9.

At the insertion step, first, as shown in FIG. 18, a part of the coupling end portion 931 of the cable 93 at the end surface 933 side is mounted on the connector main body 921 in the third gripping state. Concurrently, the coupling end portion 931 of the cable 93 comes into contact with the connector main body 921 and a force acts thereon. The force is detected by the force detection unit 19. Then, the control apparatus 200 controls a time to stop the movement of the cable 93 based on a detection result in the force detection unit 19. Then, as shown in FIG. 19, the coupling end portion 931 of the cable 93 is moved on the connector main body 921 along the planer direction of the board 91, particularly, the positive side in the Y-axis direction remaining in the third gripping state.

During the insertion action, the coupling end portion 931 of the cable 93 comes into contact with the connector main body 921 of the connector 92 and a force acts on the gripping unit 201. The force is detected by the force detection unit 19. Then, the control apparatus 200 controls a time to stop the insertion action based on a detection result in the force detection unit 19. For example, when the force detected by the force detection unit 19 reaches a third threshold value in the position in which the coupling end portion 931 is in contact with the opened lid body 922, the apparatus stops the insertion action. Or, for example, in the insertion action, the coupling end portion 931 of the cable 93 may be inserted while the coupling end portion 931 of the cable 93 is moved toward the positive side in the X-axis direction, the negative side in the X-axis direction, the positive side in the Z-axis direction, and the negative side in the Z-axis direction so that the force acting from the connector 92 may be smaller.

Also, at the insertion step, the insertion action is performed with the tab 932 of the cable 93 nipped so that the nipping directions by the nipping part 203 may be along the upward and downward directions. Thereby, the aligned state may be stably maintained, and thus, the insertion action may be smoothly performed. Then, after the insertion action, the cable 93 and the connector 92 may be electrically coupled.

8 Lid Closing Step

Figure 10:
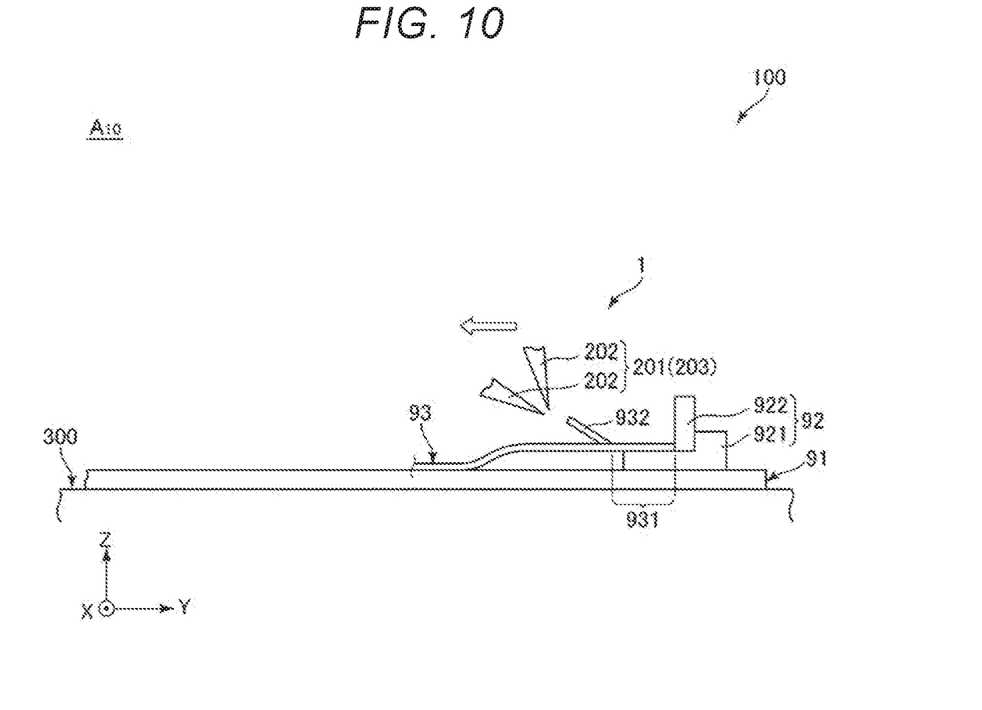
FIG. 10 is a side view sequentially showing an action state of the robot when the robot system shown in FIG. 1 executes the coupling method shown in FIG. 2.
Figure 11:
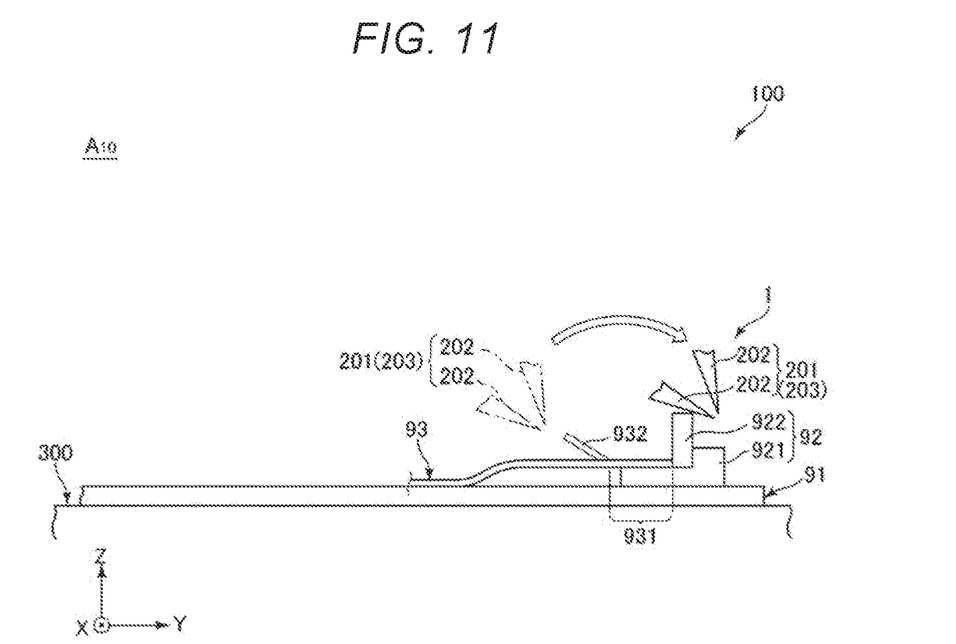
FIG. 11 is a side view sequentially showing an action state of the robot when the robot system shown in FIG. 1 executes the coupling method shown in FIG. 2.

As shown in FIGS. 10 to 12, the lid closing step is a step for a lid closing action to close the opened lid body 922.

In the lid closing action, first, as shown in FIG. 10, the third gripping state is released and the gripping unit 201 is moved toward the negative side in the Y-axis direction. Thereby, the gripping unit 201 is separated from the tab 932 of the cable 93. Then, as shown in FIG. 11, the gripping unit 201 is engaged with the opened lid body 922 from the positive side in the Y-axis direction. Then, as shown in FIG. 12, the gripping unit 201 is moved toward the negative side in the Y-axis direction. Thereby, as shown in FIG. 20, the lid body 922 may be closed, and thus, the electronic component assembly 9 is obtained. A program for the lid closing action is stored in the control apparatus 200 in advance.

As described above, the connector 92 has the openable lid body 922.

Then, when the lid body 922 is closed, at the lid opening step between the correction step and the insertion step, the control apparatus 200 may control the robot 1 to perform the lid opening action to open the lid body 922. Further, at the lid closing state after the lid opening action, the control apparatus 200 may control the robot 1 to perform the lid closing action to close the lid body 922. Thereby, even when the connector 92 has the lid body 922, the connector 92 and the cable 93 may be smoothly coupled.

As described above, when the cable 93 is coupled to the connector 92, for example, if the center line $O_{931}$ of the coupling end portion 931 is inclined relative to the center line $O_{92}$ of the connector 92 as shown in FIG. 13 before the coupling, the center line $O_{931}$ of the coupling end portion 931 and the center line $O_{92}$ of the connector 92 may be made parallel to each other by the correction action at the correction step. Thereby, the cable 93 is corrected to be insertable into the connector 92.

Or, after the correction step, as shown in FIG. 15, the center line $O_{931}$ of the coupling end portion 931 and the center line $O_{92}$ of the connector 92 are misaligned in the plan view in the thickness direction of the board 91 (the center line $O_{931}$ of the coupling end portion 931 and the center line $O_{92}$ of the connector 92 do not coincide), the alignment action at the alignment step is performed, and thereby, the cable 93 and the connector 92 may be aligned and the aligned cable 93 may be smoothly inserted into the connector 92. Thereby, the coupling action is stably performed.

As described above, the control apparatus 200 controls the time to stop the conveyance action, the correction action, or the insertion action based on the detection result in the force detection unit 19. Thereby, the respective actions may be accurately performed without excess or deficiency.

The gripping unit 201 has the nipping part 203 that nips the cable 93.

As described above, in the conveyance action, the correction action, and the insertion action, the surface of the board 91 is held to be horizontal.

The control apparatus 200 controls the robot 1 to perform the conveyance action at the conveyance step, the correction action at the correction step, or the insertion action at the insertion step in the state with the cable 93 nipped so that the nipping directions by the nipping part 203 may be the vertical directions (upward and downward directions), i.e., the cable 93 and the nipping part 203 may overlap in the plan view in the vertical direction. Thereby, the posture of the cable 93 relative to the board 91 may be stabilized, and thus, the respective actions may be accurately and smoothly performed.

Further, as described above, when controlling the robot 1 to perform the correction action at the correction step or the insertion action at the insertion step, the control apparatus 200 moves the cable 93 in a direction parallel to the surface of the board 91. Thereby, for example, because of the cable 93 nipped so that the nipping directions by the nipping part 203 may be the upward and downward directions, the posture of the cable 93 relative to the board 91 may be further stabilized. Thereby, the respective actions may be more accurately and smoothly performed.

As described above, the robot system 100 performs the coupling work of coupling the flexible cable 93 to the connector 92 provided on the board 91. The robot system 100 includes the robot 1 in which the gripping unit 201 that grips the cable 93 and the force detection unit 19 that detects the force acting on the gripping unit 201 are provided, and the control apparatus 200 that controls the robot 1.

The control apparatus 200 controls the robot 1 to perform the conveyance action for the gripping unit 201 to grip the cable 93 with the first gripping force F1 and convey the cable 93 onto the board 91, the correction action for the gripping unit 201 to grip the cable 93 with the second gripping force F2 smaller than the first gripping force F1 and correct the posture of the cable 93 based on the force acting by pressing the cable 93 against the connector 92, and the insertion action for the gripping unit 201 to grip the cable 93 with the third gripping force F3 larger than the second gripping force F2 and insert the cable 93 into the connector 92.

Further, the coupling method is a coupling method of coupling the flexible cable 93 to the connector 92 provided on the board 91. The coupling method has the preparation step of preparing the robot 1 in which the gripping unit 201 that grips the cable 93 and the force detection unit 19 that detects the force acting on the gripping unit 201 are provided, the conveyance step of gripping the cable 93 with the first gripping force F1 and conveying the cable 93 onto the board 91 by the gripping unit 201, the correction step of gripping the cable 93 with the second gripping force F2 smaller than the first gripping force F1 and correcting the cable 93 to be insertable into the connector 92 by pressing the cable 93 against the connector 92 by the gripping unit 201, and the insertion step of gripping the cable 93 with the third gripping force F3 larger than the second gripping force F2 and inserting the cable 93 into the connector 92 by the gripping unit 201.

According to the present disclosure, as described above, when the cable 93 is coupled to the connector 92 on the board 91, the coupling may be stably performed regardless of the posture of the cable 93 relative to the connector 92.

Further, in the above described embodiment, the lid closing action is performed by engaging the gripping unit 201 with the opened lid body 922 from the positive side in the Y-axis direction, however, another robot than the robot inserting the cable 93 into the connector 92 may perform the action.

Figure 21:
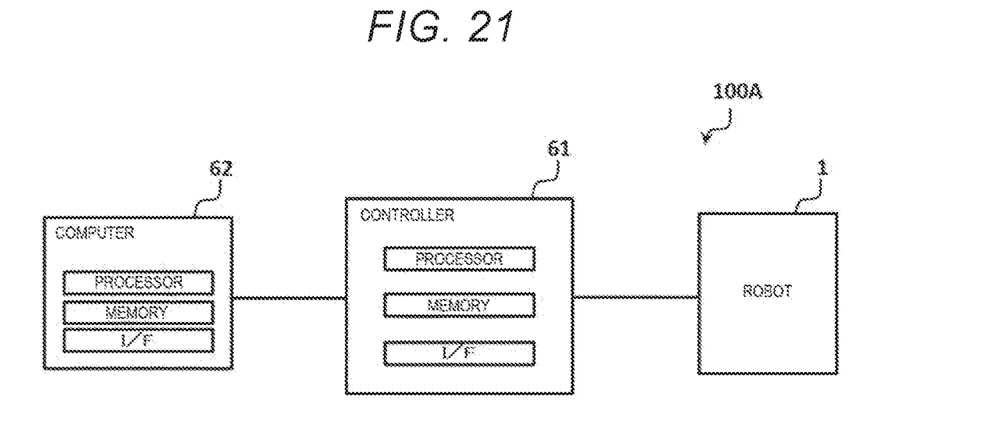
FIG. 21 is a block diagram for explanation of the robot system with a focus on hardware.

FIG. 21 is the block diagram for explanation of the robot system with the focus on hardware.

FIG. 21 shows an overall configuration of a robot system 100A in which the robot 1, a controller 61, and a computer 62 are coupled. The control of the robot 1 may be executed by reading commands in a memory using a processor in the controller 61 or executed via the controller 61 by reading commands in a memory using a processor in the computer 62.

Therefore, one or both of the controller 61 and the computer 62 may be regarded as "control apparatus 200".

Modified Example 1

Figure 22:
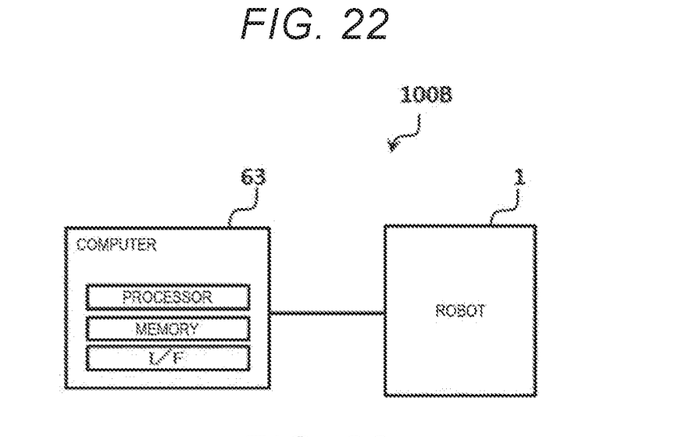
FIG. 22 is a block diagram showing modified example 1 with a focus on hardware of the robot system.

FIG. 22 is the block diagram showing modified example 1 with the focus on hardware of the robot system.

FIG. 22 shows an overall configuration of a robot system 100B in which a computer 63 is directly coupled to the robot 1. The control of the robot 1 is directly executed by reading commands in a memory using a processor in the computer 63.

Therefore, the computer 63 may be regarded as "control apparatus 200".

Modified Example 2

Figure 23:
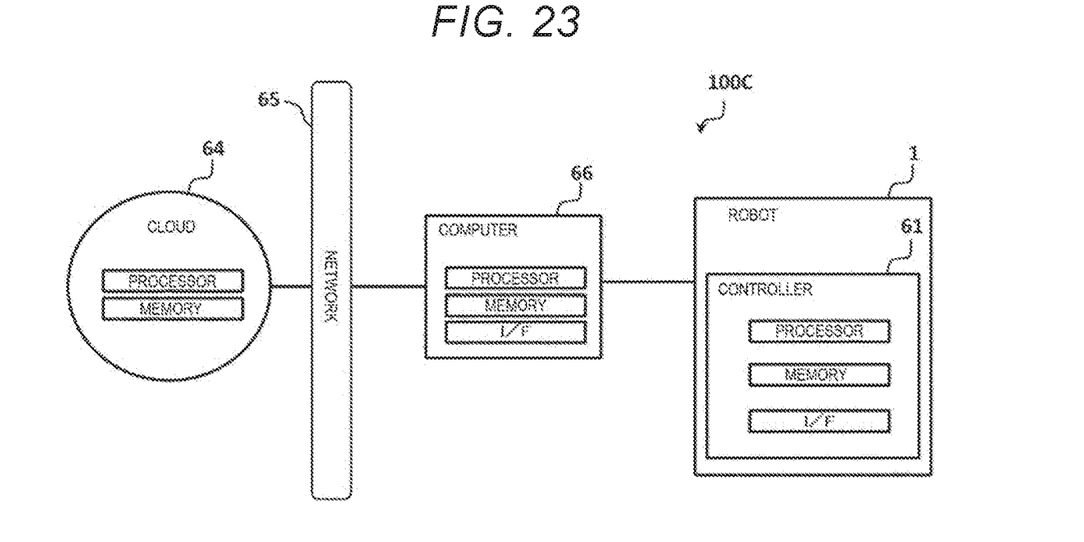
FIG. 23 is a block diagram showing modified example 2 with a focus on hardware of the robot system.

FIG. 23 is the block diagram showing modified example 2 with the focus on hardware of the robot system.

FIG. 23 shows an overall configuration of a robot system 100C in which the robot 1 containing the controller and a computer 66 are coupled and the computer 66 is coupled to a cloud 64 via a network 65 such as a LAN. The control of the robot 1 may be executed by reading commands in a memory using a processor in the computer 66 or executed via the computer 66 by reading commands in a memory using a processor on the cloud 64.

Therefore, one, two, or three of the controller 61, the computer 66, and the cloud 64 may be regarded as "control apparatus 200".

As above, the robot system and coupling method according to the present disclosure are explained with respect to the illustrated embodiments, however, the present disclosure is not limited to those. The respective parts forming the robot system may be replaced by arbitrary configurations that may fulfill the same functions. Further, an arbitrary configuration may be added thereto.

What is claimed is:

1. A robot system that performs work of coupling a flexible cable to a connector provided on a board, comprising:
    a robot in which a gripping unit that grips the cable and a force detection unit that detects a force acting on the gripping unit are provided; and
    a robot control apparatus that controls the robot, wherein the robot control apparatus controls the robot to perform
    a conveyance action for the gripping unit to grip the cable with a first gripping force and convey the cable onto the board,
    a correction action for the gripping unit to grip the cable with a second gripping force smaller than the first gripping force and correct a posture of the cable based on the force acting by pressing the cable against the connector, and
    an insertion action for the gripping unit to grip the cable with a third gripping force larger than the second gripping force and insert the cable into the connector.

2. The robot system according to claim 1, wherein the robot control apparatus stops the conveyance action, the correction action, or the insertion action based on a detection result in the force detection unit.

3. The robot system according to claim 1, wherein the robot has an imaging unit that captures the cable gripped by the gripping unit and the connector, and the robot control apparatus controls the robot to perform an alignment action to align the cable gripped by the gripping unit with the connector based on an imaging result in the imaging unit with the cable separated from the connector between the correction action and the insertion action.

4. The robot system according to claim 1, wherein the connector has an openable lid body, and the robot control apparatus controls the robot to perform
    a lid opening action to open the lid body between the correction action and the insertion action when the lid body is closed, and
    a lid closing action to close the lid body after the lid opening action.

5. The robot system according to claim 1, wherein the robot control apparatus moves the cable in a direction parallel to a surface of the board when controlling the robot to perform the correction action or the insertion action.

6. The robot system according to claim 1, wherein the gripping unit has a nipping part that nips the cable, a surface of the board is held to be horizontal, and the robot control apparatus controls the robot to perform the conveyance action, the correction action, or the insertion action with the cable nipped so that the cable and the nipping part overlap in plan view in a vertical direction.

7. A coupling method of coupling a flexible cable to a connector provided on a board, comprising:
    a preparation step of preparing a robot in which a gripping unit that grips the cable and a force detection unit that detects a force acting on the gripping unit are provided;
    a conveyance step of gripping the cable with a first gripping force and conveying the cable onto the board by the gripping unit;
    a correction step of gripping the cable with a second gripping force smaller than the first gripping force and correcting a posture of the cable based on the force acting by pressing the cable against the connector by the gripping unit; and
    an insertion step of gripping the cable with a third gripping force larger than the second gripping force and inserting the cable into the connector by the gripping unit.

8. The coupling method according to claim 7, wherein the conveyance step, the correction step, or the insertion step is stopped based on a detection result in the force detection unit.

9. The coupling method according to claim 7, wherein the robot has an imaging unit that captures the cable gripped by the gripping unit and the connector, further comprising an alignment step of aligning the cable gripped by the gripping unit and the connector based on an imaging result in the imaging unit with the cable separated from the connector between the correction step and the insertion step.

10. The coupling method according to claim 7, wherein the connector has an openable lid body, further comprising:
    a lid opening step of opening the lid body between the correction step and the insertion step when the lid body is closed; and
    a lid closing step of closing the lid body after the lid opening step.

11. The coupling method according to claim 7, wherein the cable is moved in a direction parallel to a surface of the board when performing the correction step or the insertion step.

12. The coupling method according to claim 7, wherein the gripping unit has a nipping part that nips the cable, a surface of the board is held to be horizontal, and the conveyance step, the correction step, or the insertion step is performed with the cable nipped so that the cable and the nipping part overlap in a vertical direction.

* * * * *